US011007972B2

(12) United States Patent
Miller et al.

(10) Patent No.: US 11,007,972 B2
(45) Date of Patent: May 18, 2021

(54) MULTI-PULL LATCH AND LOCK SYSTEMS FOR COMPARTMENT CLOSURE ASSEMBLIES OF MOTOR VEHICLES

(71) Applicant: GM Global Technology Operations LLC, Detroit, MI (US)

(72) Inventors: Jason M. Miller, St. Clair Shores, MI (US); James N. Nelsen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 795 days.

(21) Appl. No.: 15/712,218

(22) Filed: Sep. 22, 2017

(65) Prior Publication Data

US 2019/0092273 A1  Mar. 28, 2019

(51) Int. Cl.
*B60R 21/38* (2011.01)
*E05B 79/00* (2014.01)
(Continued)

(52) U.S. Cl.
CPC .............. *B60R 21/38* (2013.01); *E05B 79/00* (2013.01); *E05B 79/20* (2013.01); *E05B 81/25* (2013.01);
(Continued)

(58) Field of Classification Search
CPC .......... E05B 81/14; E05B 79/20; E05B 81/16; E05B 77/26; E05B 81/34; E05B 77/28; E05B 81/25; E05B 81/90; E05B 77/265; E05B 81/08; E05B 81/36; E05B 47/0603; E05B 81/28; E05B 47/0004;
(Continued)

(56) References Cited

U.S. PATENT DOCUMENTS 4,633,724 A * 1/1987 Mochida ............... E05B 53/005
296/76
4,702,094 A * 10/1987 Peterson ............. E05B 47/0603
180/289
(Continued)

FOREIGN PATENT DOCUMENTS

CN           1354824 A    6/2002
CN         103573025 A    2/2014
(Continued)

*Primary Examiner* — Mark A Williams
(74) *Attorney, Agent, or Firm* — Quinn IP Law (57) ABSTRACT

Disclosed are lock mechanisms for latch assemblies of vehicle compartment hoods, methods for making or using such lock mechanisms, and motor vehicles equipped with a multi-pull latch and lock system for releasably locking a hood assembly. A lock mechanism includes a gear that couples a closure latch to a latch release mechanism. The gear moves between a latched position, whereat the closure latch secures the closure in a closed position, and an unlatched position, whereat the gear transfers activation forces from the release mechanism to disengage the closure latch from the closure. A pawl is movable between a locked position, whereat the pawl engages and locks the gear in the latched position, and an unlocked position, whereat the pawl disengages the gear. An actuator is operatively engaged with a vehicle door to automatically move the pawl to the unlocked position responsive to movement of the door to an open position.

20 Claims, 3 Drawing Sheets

(51) Int. Cl.
*E05B 79/20* (2014.01)
*E05B 81/24* (2014.01)
*E05B 83/24* (2014.01)
*F15B 15/19* (2006.01)
*F15B 15/22* (2006.01)
*F16F 9/02* (2006.01)
*E05B 81/46* (2014.01)
*F16J 10/02* (2006.01)

(52) U.S. Cl.
CPC .............. *E05B 83/24* (2013.01); *F15B 15/19* (2013.01); *F15B 15/22* (2013.01); *F16F 9/0281* (2013.01); *E05B 81/46* (2013.01); *F16J 10/02* (2013.01)

(58) Field of Classification Search
CPC .. E05B 79/008; E05B 83/24; Y10T 292/1047; Y10T 70/7062; Y10T 70/7102; Y10T 292/0908; Y10T 74/1967; Y10S 292/23; Y10S 292/43; Y10S 292/65; Y10S 292/14; Y10S 292/42; B60R 21/38; F15B 15/19; F15B 15/22; F16F 9/0281
See application file for complete search history.

(56) References Cited

U.S. PATENT DOCUMENTS

| | | | |
|---|---|---|---|
| 5,074,603 A | 12/1991 | Brackmann | |
| 5,101,597 A | 4/1992 | Pelachyk et al. | |
| 5,137,311 A | 8/1992 | Brackmann | |
| 5,183,302 A | 2/1993 | Pelachyk et al. | |
| 5,503,441 A * | 4/1996 | Schwaiger | E05B 81/25 292/142 |
| 5,618,069 A | 4/1997 | Konchan et al. | |
| 5,769,468 A | 6/1998 | Armbruster | |
| 5,785,364 A | 7/1998 | Kleefeldt et al. | |
| 5,897,148 A | 4/1999 | Arabia, Jr. et al. | |
| 6,048,002 A | 4/2000 | Ohta et al. | |
| 6,052,948 A | 4/2000 | Spitzley | |
| 6,062,613 A * | 5/2000 | Jung | E05B 81/06 292/201 |
| 6,079,237 A | 6/2000 | Hochart | |
| 6,523,871 B1 | 2/2003 | Josserand | |
| 6,594,861 B2 | 7/2003 | Dimig et al. | |
| 6,817,636 B1 | 11/2004 | Evans et al. | |
| 6,880,870 B2 | 4/2005 | Costigan | |
| 7,111,878 B2 | 9/2006 | Kachouh | |
| 7,195,090 B2 | 3/2007 | Parks et al. | |
| 7,260,964 B2 | 8/2007 | Velicanin et al. | |
| 7,506,903 B2 | 3/2009 | Sattler et al. | |
| 7,665,776 B2 | 2/2010 | Lang | |
| 8,047,586 B2 | 11/2011 | Pilotelli | |
| 8,128,137 B2 | 3/2012 | Takaya et al. | |
| 8,196,507 B2 | 6/2012 | Schafer et al. | |
| 8,348,310 B2 | 1/2013 | Vazquez et al. | |
| 8,376,424 B2 | 2/2013 | Bejune | |
| 8,388,029 B2 | 3/2013 | Pecoul et al. | |
| 8,419,114 B2 | 4/2013 | Fannon et al. | |
| 8,469,411 B2 | 6/2013 | Costigan | |
| 8,596,180 B2 | 12/2013 | Schaefer et al. | |
| 8,656,716 B2 | 2/2014 | Schafer | |
| 8,894,106 B2 | 11/2014 | Vazquez et al. | |
| 9,062,477 B2 | 6/2015 | Da Deppo et al. | |
| 9,284,757 B2 * | 3/2016 | Kempel | E05B 83/26 |
| 9,376,834 B2 | 6/2016 | Liang et al. | |
| 9,611,675 B2 * | 4/2017 | Wittelsbuerger | E05B 79/20 |
| 2002/0070564 A1 | 6/2002 | Ohta et al. | |
| 2003/0038484 A1 | 2/2003 | Schwaiger et al. | |
| 2003/0038485 A1 | 2/2003 | Schwaiger et al. | |
| 2004/0004357 A1 | 1/2004 | Arlt et al. | |
| 2005/0280265 A1 * | 12/2005 | Iliescu | E05B 81/14 292/216 |
| 2007/0210588 A1 * | 9/2007 | Cetnar | E05B 77/28 292/216 |
| 2009/0007707 A1 * | 1/2009 | Schumacher | E05B 81/25 74/30 |
| 2009/0039657 A1 | 2/2009 | Schuck | |
| 2009/0217809 A1 | 9/2009 | Schafer et al. | |
| 2010/0089048 A1 | 4/2010 | Schaefer | |
| 2010/0171320 A1 | 7/2010 | Cumbo et al. | |
| 2010/0194120 A1 | 8/2010 | Kaiser et al. | |
| 2011/0012378 A1 | 1/2011 | Ueno et al. | |
| 2011/0204659 A1 | 8/2011 | Estrada et al. | |
| 2012/0091738 A1 | 4/2012 | Coleman et al. | |
| 2012/0204562 A1 | 8/2012 | Schafer et al. | |
| 2013/0140831 A1 * | 6/2013 | Kempel | E05B 83/26 292/3 |
| 2014/0292000 A1 | 10/2014 | Vazquez et al. | |
| 2015/0233147 A1 * | 8/2015 | Martinez | E05B 81/25 292/142 |
| 2015/0308161 A1 | 10/2015 | Rosales | |
| 2015/0368938 A1 * | 12/2015 | Erices | E05B 81/16 292/143 |
| 2019/0211590 A1 * | 7/2019 | Tieman | E05B 83/24 |

FOREIGN PATENT DOCUMENTS

| | | |
|---|---|---|
| CN | 204876927 U | 12/2015 |
| DE | 19617428 A1 | 11/1997 |
| DE | 19930339 A1 | 1/2001 |
| DE | 10336418 A1 | 3/2005 |
| DE | 102005015515 A1 | 10/2006 |
| DE | 102005056788 A1 | 5/2007 |
| DE | 202009016636 A1 | 4/2011 |
| DE | 201110114148201 A1 | 3/2013 |
| DE | 102012104775 A1 | 12/2013 |
| EP | 0980948 A1 | 2/2000 |
| EP | 1801331 A1 | 6/2007 |
| FR | 2989407 A1 | 10/2013 |

* cited by examiner

MULTI-PULL LATCH AND LOCK SYSTEMS FOR COMPARTMENT CLOSURE ASSEMBLIES OF MOTOR VEHICLES

INTRODUCTION

The present disclosure relates generally to latching systems for compartment closure assemblies of motor vehicles. More specifically, aspects of this disclosure relate to lock mechanisms for the latch assemblies of engine compartment hoods.

Many current production motor vehicles, such as the modern-day automobile, employ reciprocating-piston type internal combustion engines to propel the vehicle and power the onboard vehicle electronics. Hybrid and full-electric vehicles, on the other hand, utilize alternative power sources, such as an electric motor-generator, to propel the vehicle and, thus, minimize or eliminate reliance on an engine for power. For most automotive powertrain designs, the prime mover—whether it be engine or motor—is mounted within a dedicated engine compartment interposed between the passenger compartment and front bumper. A hood assembly (or "bonnet" in some countries) extends over and covers the engine compartment to prevent theft or damage of the engine bay components. When opened, the hood allows access to the engine compartment for maintenance and repair. On passenger cars, the engine hood is typically hinged to a forward bulkhead underneath the dashboard panel or to lateral engine compartment rails of the body in white (BIW). The forward end of the hood is secured to a front bulkhead or tie bar cross-member via a releasable latching mechanism. For motor vehicles with a mid-engine or a rear-engine layout, the engine compartment and, thus, the hood are located towards the middle or rear of the vehicle, as opposed to the forward location of most traditional vehicle designs.

SUMMARY

Disclosed herein are multi-pull lock mechanisms for latch assemblies of vehicle compartment covers, methods for making and methods for using such multi-pull lock mechanisms, and vehicles equipped with a multi-pull latch and lock system for locking closed and restrictively opening an engine hood assembly. By way of example, there is presented a cable-driven 2×-pull latch system with a splitter box lockout device that compels a user to open a vehicle door in order to unlock the latch release lever such that the hood can be unlatched and opened. Alternatively, the lockout device can interact with a vehicle shift cable or an electronic park release to unlock the latch when the vehicle is shifted into park. This latch system uses a primary latch for securing the hood in a closed position, a release lever operable from inside the vehicle to move the primary latch to an unlatched position, and latch cables connecting the primary latch to the release lever. An optional pop-up spring, air cylinder or other related mechanism biases the unlatched hood to an open position. If so desired, a secondary latch may be implemented to secure the hood in a partially open position to further assist with preventing the hood from accidentally opening while the vehicle is moving.

The splitter box lockout device is operatively interposed between the primary latch and the release lever, regulating the transfer of activation forces therebetween. This lockout device employs a slidable gear rack that is releasably secured in place by a pivotably mounted pawl. The gear rack is mechanically connected at one end thereof to the primary latch, e.g., via one segment of latch cable, and at another end to the latch release lever, e.g., via another segment of latch cable. A torsional spring biases the pawl into engagement with the teeth of the gear rack. An electronic actuator, such as a linear solenoid, servomotor, etc., disengages the pawl from the gear rack in response to a signal indicating the opening of the driver-side door. Alternatively, a cable that operatively engages a vehicle door pulls the pawl out of engagement when the door is opened. To disengage the lock device and unlatch the hood, a user first pulls open the driver door, which operates to disengage the pawl from the gear rack; the user then pulls on the release lever, which operates to disengage the primary latch. The user may then be required to mechanically disengage the secondary latch and lift open the hood. If a 2×-pull hood latch is utilized, the release lever may be pulled a second time to disengage the secondary latch. An optional alternative architecture connects the cable from the lockout pawl to the vehicle transmission such that the pawl is lifted from engagement with the gear rack when the vehicle is shifted into park.

Attendant benefits for at least some of the disclosed concepts include a simple, cost-effective feature that effectively prevents a user from inadvertently disengaging the hood latch while the vehicle is moving. Disclosed double-pull lock designs are discretely packaged so as to not be visible to the user, and do not use door trim to lockout the release lever, making the look and packaging of the release lever more natural and aesthetically pleasing. Other attendant benefits may include hood latch release lever locking devices that can be retrofit or otherwise implemented for almost any existing 2× pull latch programs.

Aspects of the present disclosure are directed to lockout devices for restricting the opening of a vehicle compartment closure assembly. Disclosed, for example, is a lock mechanism for the latch system of a vehicle hood assembly. The hood assembly is movably mounted, e.g., via lateral hinges, to the vehicle body. The hood may be mounted in any available configuration, including flip-front, winged, and traditional mountings architectures. The latch system includes a hood latch that releasably secures the hood assembly in a closed position, e.g., extending over and covering the engine bay. A release mechanism, such as a release lever or button disposed within the passenger compartment proximal the driver seat, is operable to disengage the hood latch so that the hood may be opened.

The lock mechanism includes a gear, which may be in the nature of a slidable gear rack or ratchet gear, that attaches to the vehicle body and couples the hood latch to the release mechanism. This gear is movable, e.g., within a protective outer housing, between latched and unlatched positions. When secured in the latched position, the gear does not transfer activation forces from the release mechanism to the hood latch; as a result, the latch continues to secure the hood assembly in the closed position. When in the unlatched position, however, the gear has transferred an activation force from the release mechanism to the hood latch; this, in turn, causes the hood latch to disengage from the hood assembly such that the hood may be opened. A pawl is attached to the vehicle body, e.g., via the protective outer housing, to move between locked and unlocked positions. When in the locked position, the pawl meshingly engages and thereby locks the gear in the latched position. Conversely, when moved to the unlocked position, the pawl disengages the gear allowing the gear to move to the unlatched position. An electronic, mechanical or electromechanical lock actuator is coupled to the pawl; this actuator operatively engages the vehicle door to automatically move the pawl to the unlocked position responsive to movement of the door to an open position.

Other aspects of the present disclosure are directed to motor vehicles equipped with a multi-pull latch and lock system for latching closed and governing the opening of an engine hood assembly. As used herein, the term "motor vehicle" may include any relevant vehicle platform, such as passenger vehicles (combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with a passenger compartment aft of an engine compartment. An engine and/or a motor is mounted inside the engine compartment. Covering the upper opening to the engine compartment is a hood assembly that is pivotably mounted to the vehicle body. This hood assembly is manually or automatically movable between open and closed positions. A vehicle door is movably mounted to the vehicle body, covering an opening for entering and exiting the passenger compartment. A primary latch releasably secures the hood assembly in the closed position. A release mechanism is located within the passenger compartment and operable to disengage the primary latch.

Continuing with the above example, the motor vehicle is equipped with a lock mechanism for regulating the activation of the release mechanism. This lock mechanism includes a lock housing that is mounted, e.g., to the forward firewall or dash panel of the vehicle body. A gear rack, which is slidably mounted inside the housing, mechanically couples the primary latch to the release mechanism, e.g., via individual segments of cable. The gear rack is movable between a latched position, whereat the release mechanism is deactivated and the primary latch secures the hood assembly in the closed position, and an unlatched position, whereat the gear rack transfers an activation force from the release mechanism to the primary latch to thereby disengage the primary latch from the hood assembly. A pawl, which is rotatably mounted inside the lock housing, is movable between locked and unlocked positions. In the locked position, the pawl meshingly engages and thereby locks the gear rack in the latched position. On the other hand, when moved to the unlocked position, the pawl disengages the gear rack such that the gear rack is free to slide within the housing. A lock actuator is mechanically coupled to the pawl and operatively engaged with the vehicle door. The lock mechanism employs the lock actuator to automatically move the pawl to the unlocked position responsive to movement of the vehicle door to an open position.

Additional aspects of the present disclosure are directed to methods for making and methods for using multi-pull lockout devices for hood latch assemblies of motor vehicles. Disclosed, for example, is a method of assembling a lock mechanism for a latch system of a vehicle hood assembly. The representative method includes, in any order and in any combination with any of the disclosed features and options: coupling a gear to the hood latch and release mechanism of the latch system; attaching the gear to the vehicle body such that the gear is movable between a latched position, whereat the hood latch secures the hood in the closed position, and an unlatched position, whereat the gear transfers an activation force from the release mechanism to the hood latch to disengage the hood latch from the hood; attaching a pawl to the vehicle body such that the pawl is movable between a locked position, whereat the pawl meshingly engages and thereby locks the gear in the latched position, and an unlocked position, whereat the pawl disengages the gear; and, attaching a lock actuator to the pawl, the lock actuator being configured to operatively engage the vehicle door to automatically move the pawl to the unlocked position responsive to movement of the opening of the vehicle door.

The above summary is not intended to represent every embodiment or every aspect of the present disclosure. Rather, the foregoing summary merely provides an exemplification of some of the novel concepts and features set forth herein. The above features and advantages, and other features and advantages of this disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, etc., are with respect to a motor vehicle, such as a forward driving direction of a motor vehicle when the vehicle is operatively oriented on a normal driving surface, for example.

Aspects of the disclosed concepts are directed to motor vehicles stock equipped with a double-pull hood latch and lock system that helps to prevent a user from releasing the hood latch when the vehicle is in motion. According to a representative configuration, the hood latch and lock cable system employs a spring-biased, plunger-style mechanical actuator that is integrated into the A-pillar of the vehicle, e.g., located adjacent the driver-side door check link. When the door is closed, the plunger is compressed, e.g., via a sealing grommet on an inboard surface of the door assembly. By compressing the plunger, a Bowden-style lock cable attached thereto helps to activate a mechanical interlock, such as a linear ratchet-and-pawl assembly, in a "splitter box" operatively interposed between the hood release handle and hood latch. The mechanical interlock prevents the user from actuating the release handle. Upon opening the door, the spring-biased plunger will expand and pull on the lock cable, which operates to release the mechanical interlock. This will allow the user to pull the release lever to disengage the primary latch and thereby release the hood. Some system arrangements will allow the user to pull the release lever a second time to disengage a secondary latch, thus allowing the hood to swing to a fully open position. The splitter box lockout device may be retrofit or integrated as original equipment into both mechanical and electro-mechanical cable-based hood release systems.

Figure 1:
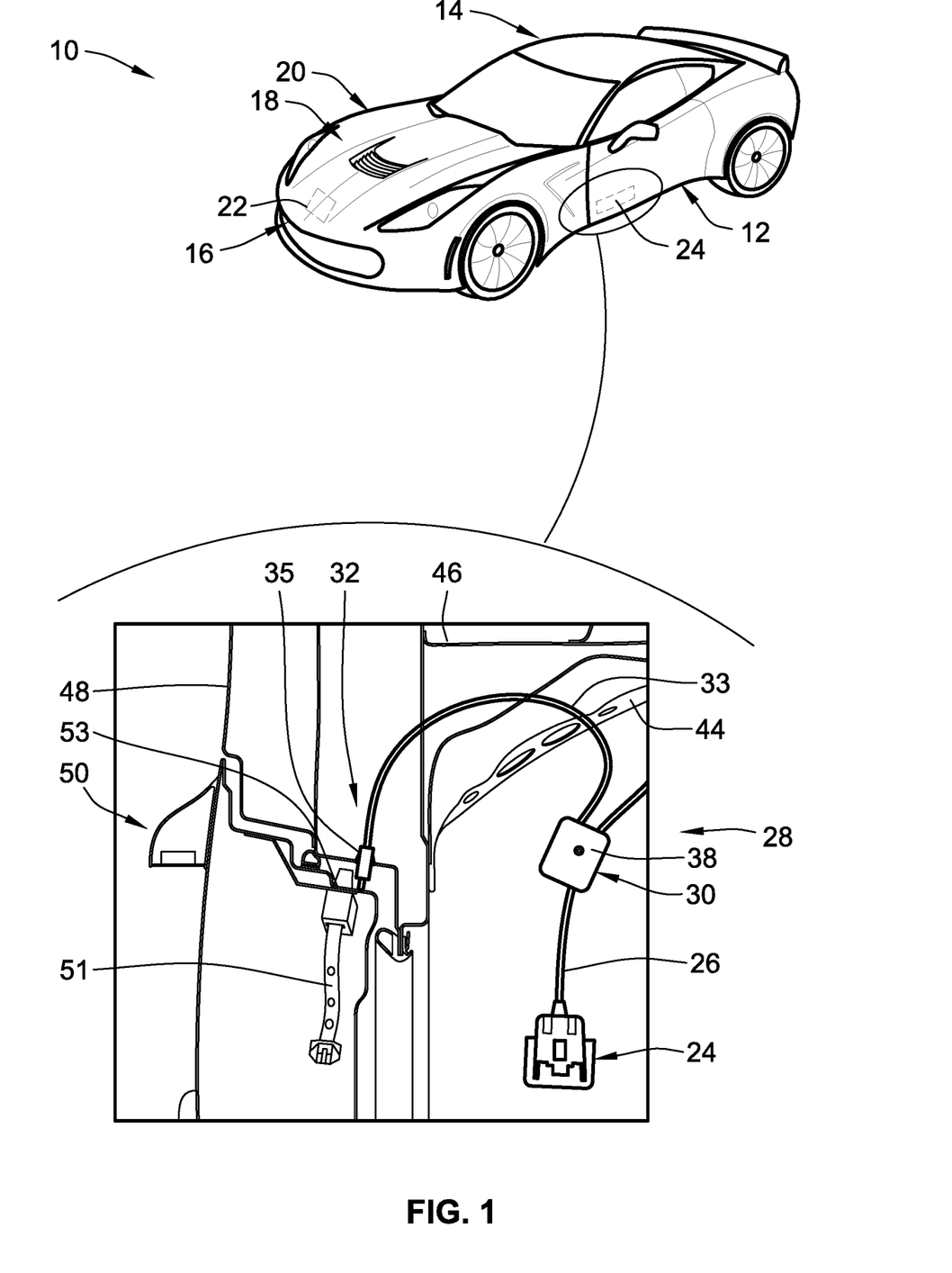
FIG. 1 is an elevated, front perspective-view illustration of a representative motor vehicle with an inset view of a representative multi-pull latch and lock system using a mechanical lock actuator in accordance with aspects of the present disclosure.

Referring now to the drawings, wherein like reference numbers refer to like features throughout the several views, there is shown in FIG. 1 a representative automobile, which is designated generally at 10 and portrayed herein for purposes of discussion as a two-seat coupe-style passenger vehicle. Mounted to the vehicle body 12, e.g., forward of a vehicle passenger compartment 14 and aft of a front bumper assembly 16, is an engine hood assembly 18 that extends across and covers an engine compartment 20. The illustrated automobile 10—also referred to herein as "motor vehicle" or "vehicle" for short—is merely an exemplary application with which novel aspects and features of this disclosure may be practiced. In the same vein, implementation of the present concepts into a front-engine-layout hood assembly should also be appreciated as a representative application of the novel aspects and features disclosed herein. As such, it will be understood that aspects and features of this disclosure may be integrated into any type of engine and hood layout, applied to other compartment closure assemblies, and implemented for any logically relevant type of motor vehicle. Lastly, the drawings presented herein are not necessarily to scale and are provided purely for instructional purposes. Thus, the specific and relative dimensions shown in the drawings are not to be construed as limiting.

Engine hood assembly 18 of FIG. 1 may be pivotally mounted to one or more structural load-bearing body frame members of the vehicle 10 to provide access to and securely close the top portion of the engine compartment 20. For instance, the hood assembly 18 is shown pivotally mounted via a pair of dual-point hinges with pneumatic cylinder actuators to the lateral engine compartment rails (not visible in the views provided) of the vehicle body 12. The vehicle 10 is equipped with a multi-pull latch and lock system 28 that employs a concealed hood latch 22 to secure the engine hood assembly 18 in a closed position, as shown in FIG. 1.

A hood latch release mechanism 24, shown located inside the passenger compartment, e.g., underneath the steering column or adjacent the driver seat frame, includes a lever or button that is pulled, pressed or otherwise activated to apply a tensile force to a hood release latch cable 26. The loaded latch cable 26 of the latch and lock system 28, which may be a Bowden-type cable, activates the spring-biased hood latch 22 at the front end of the engine hood assembly 18 opposite the hinge mount. This allows the hood assembly 18 to be moved to an open position, e.g., under the biasing force of the pneumatic cylinders. Other mounting and latching architectures, including mechanical, electrical, and electro-mechanical configurations, are envisioned as being within the scope of this disclosure.

Figure 2:
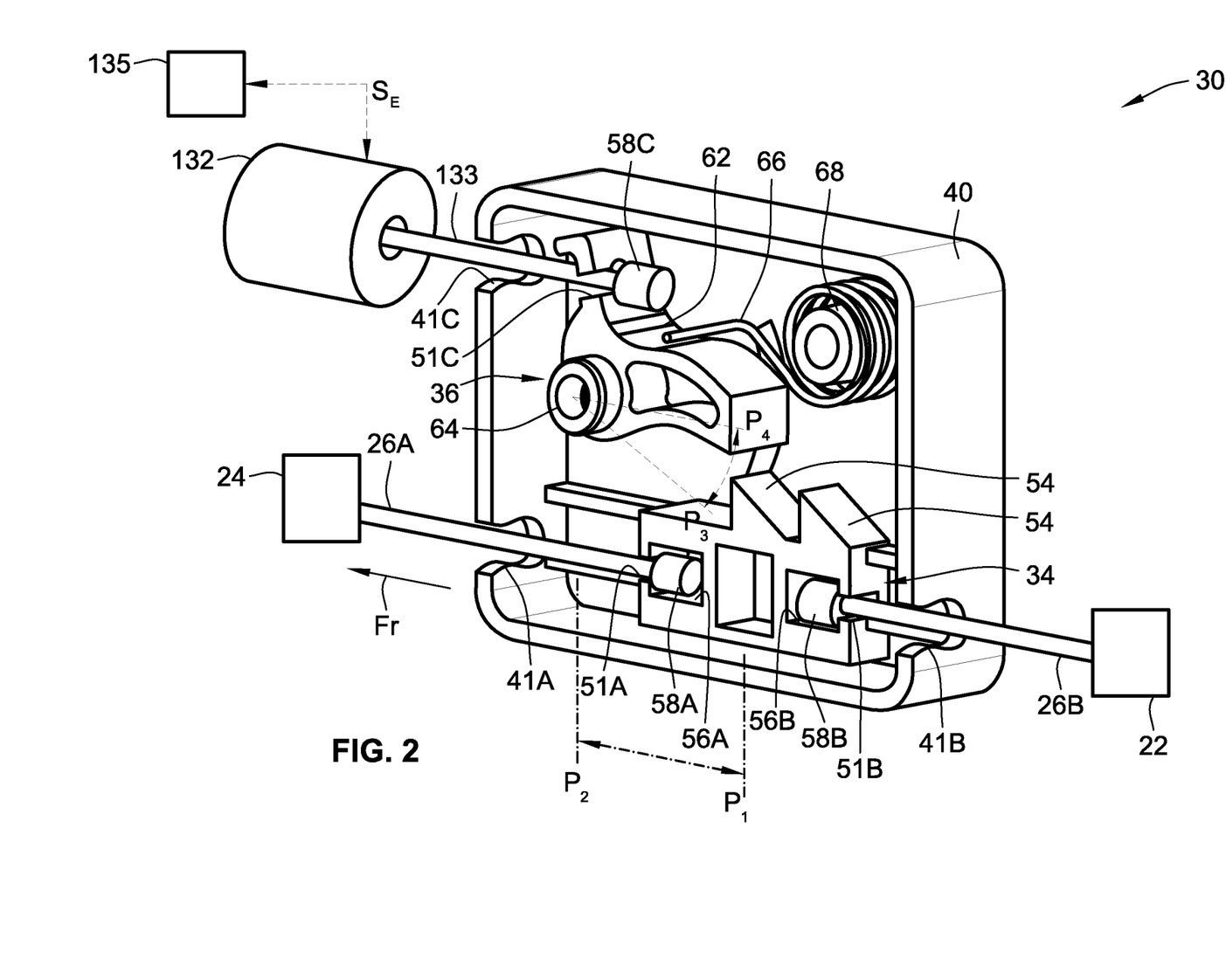
FIG. 2 is a perspective-view illustration of the representative splitter box lockout device of the multi-pull latch and lock system of FIG. 1, shown with the lock housing cover removed and using an electro-mechanical lock actuator.

Presented in the inset view of FIG. 1 is a "splitter box" lockout device 30 (also referred to herein as "lock mechanism") that is designed to help prevent the unlatching of the hood latch 22 during movement of the automobile 10. FIG. 1 illustrates a representative multi-pull latch and lock system 28 architecture with a lock mechanism 30 that employs a mechanical lock actuator, designated generally at 32, for selectively locking and unlocking the lock mechanism 30. By comparison, FIG. 2 illustrates an application in which the lock mechanism 30 utilizes an electro-mechanical lock actuator, shown schematically at 132, for selectively locking and unlocking the lock mechanism 30. While differing in this manner, it is envisioned that any of the features disclosed with reference to the examples of FIGS. 2 and 3 can be incorporated, singly or in any combination, into the example of FIG. 1, and vice versa. Alternative configurations may utilize linear and non-linear actuators or transducers, including hydraulic, pneumatic, piezoelectric, and other logically applicable devices, for providing any requisite locking and unlocking functionality.

Figure 3:
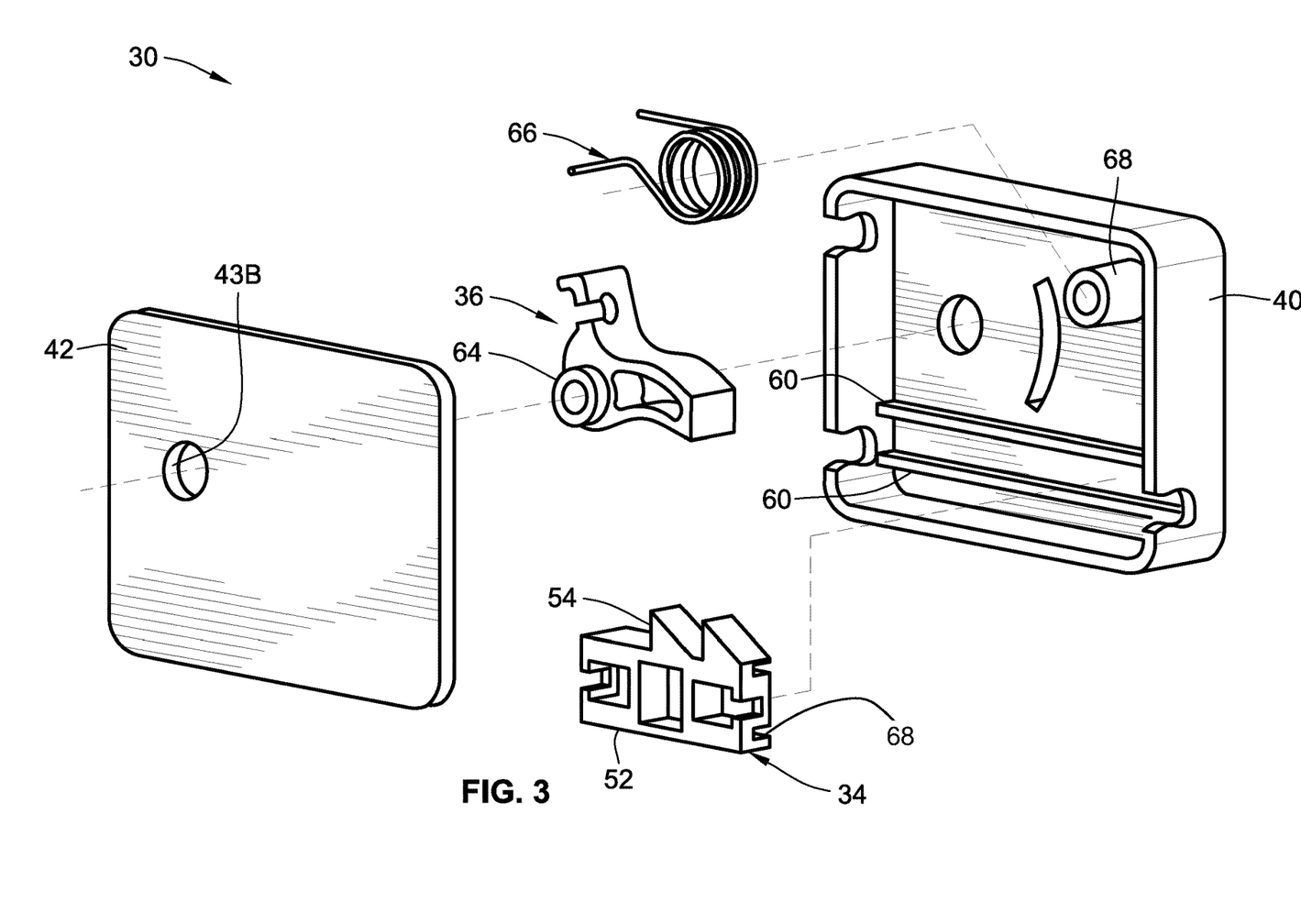
FIG. 3 is an exploded perspective-view illustration of the representative splitter box lockout device of FIG. 2.

With collective reference to both FIGS. 2 and 3, the lock mechanism 30 is generally composed of three interoperable components: the lock actuator 32, 132, a moveable gear 34, and a pawl 36 that is repositioned by the lock actuator 32, 132 to selectively mate with the gear 34 and thereby lock the lock mechanism 30. It is envisioned that the lock mechanism 30 be comprised of greater or fewer components than those previously described. By way of non-limiting example, the lock mechanism 30 may utilize a rigid, durable and weather-resistant lock housing 38 that mounts to the vehicle body 12. According to the illustrated example, the lock housing 38 is rigidly mounted, e.g., via clips, dedicated bracket, grommets, or screws, to a front firewall dash panel 44, adjacent an instrument panel (IP) beam 46 and front hinge pillar 48, inboard from a driver-side door assembly 50. As best seen in in FIG. 3, the illustrated lock housing 38 is a bipartite construction that may generally consist of a cover 42 that attaches to an outer shell 40, e.g., via snap-lock tabs or threaded fasteners (not shown), to enclose the gear 34 and pawl 36 within the housing 38. It may be desirable that the gear 34, pawl 36 and housing 38 be compact and constructed of a suitable lightweight material, such as thermoplastic polymers and other plastic materials, or aluminum, titanium and other light metals, or combinations thereof. As shown, these constituent parts are fabricated from injection molded acrylonitrile butadiene styrene (ABS) or high impact polystyrene (HIPS). Clearly, the shape, size and/or number of housing segments may be modified, for example, to accommodate packaging and design requirements for different vehicle platforms. On the other hand, the housing 38 could be eliminated altogether, with the constituent parts of the lock mechanism 30 stowed within existing vehicle structure. As an optional alternative, the housing 38 can be suspended in space by the cables, and isolated from adjacent components, e.g., by foam wrapping or tape.

Lock gear 34 acts as a functional intermediary that governs the transmission of unlatching forces between the release mechanism 24 and the latch 22 for opening the engine hood 18. This movable gear element 34 is operatively interposed between and mechanically couples the primary hood latch 22 to the hood latch release mechanism 24. In accord with the illustrated example, the gear 34 may be integrally formed as an elongated gear rack 52 with one or more teeth 54 projecting transversely from a lateral side of the gear rack 52. One segment of latch cable, namely first cable 26A, connects the release mechanism 24 to the gear 34, whereas a different segment of the latch cable, namely second cable 26B, connects the gear 34 to the hood latch 22. While various means of attachment may be implemented, the gear 34 of FIGS. 2 and 3 is fabricated with a pair of anchor slots 56A and 56B disposed at respective opposing first and second longitudinal ends of the rack 52. Each anchor slot 56A, 56B is shaped and sized to trap therein a complementary anchor 58A and 58B of a respective one of the cables 26A and 26B. As seen in FIG. 2, for example, the first cable 26A inserts through a first window 41A in an upstream sidewall of the lock housing's outer shell 40 such that a distal end of the cable 26A passes through a narrow anchor detent 51A in an upstream end of the elongated gear rack 52. Likewise, the second cable 26B inserts through a second window 41A in a downstream sidewall of the outer shell 40 such that a distal end of this cable 26B passes through another narrow anchor detent 51B in a downstream end of the elongated gear rack 52. A first bulbous anchor 58A is rigidly secured to the distal end of the first cable 26A, seated inside one discrete anchor slot 56A and abutting an inside wall of the anchor detent 51A. In the same vein, a second bulbous anchor 58B is rigidly secured to the distal end of the cable 26B, seated inside the anchor slot 56B and abutting an inside wall of the respective anchor detent 51B. For at least some configurations, the anchors 58A, 58B are prevented from unseating from their respective anchor slots 56A, 56B via the cover 42, which may seat flush against one side of the gear rack 52.

With continued reference to FIGS. 2 and 3, the gear 34 is movably mounted to the vehicle body 12 via the housing 38 to transition between a latched position $P_1$ and an unlatched position $P_2$ and concomitantly assist with latching and unlatching the hood latch 22. When the gear 34 is in the latched position $P_1$, e.g., pulled to the right in FIG. 2 under a tensile force applied by a return spring in the latch 22, the release mechanism 24 is deactivated and the hood latch 22 remains engaged with and, thus, secures closed the engine hood assembly 18. Conversely, when moved to the unlatched position $P_2$, e.g., drawn to the left in FIG. 2 under a tensile force applied via the actuator mechanism 24, the gear 34 transfers an activation force from the activated release mechanism 24 to the hood latch 22. In so doing, the latch 22 is disengaged from the hood assembly 18 such that the hood 18 may be lifted, e.g., manually or via onboard vehicle actuator(s), to partially and/or fully opened positions.

Depending on the nature of the gear 34, movement to and from these positions may be made along straight, circular, arcuate or other functionally applicable paths. As per the illustrated example, the elongated gear rack 52 slides back-and-forth along a substantially rectilinear path (indicated by the double-headed arrow connecting $P_1$ and $P_2$ in FIG. 2) between the latched and unlatched positions. Lock housing 38 may be fabricated with at least one or, as shown in FIG. 2, two elongated, substantially straight guide rails 60 (FIG. 3) that are received in complementary recessed guide slots 68 that extend longitudinally along the length of the elongated gear rack 52. During assembly of the lockout device 30, the gear 34 is seated on these guide rails 60, and then sandwiched between the housing's outer shell 40 and cover 42. While shown as a linear gear rack, the gear 34 may take on other available configurations, including spur gears, ratchet gears, internal gears, etc., without departing from the intended scope of this disclosure.

A ratcheting pawl 36 is movably attached to the vehicle body 12 via lock housing 38 to transition back-and-forth between locked $P_3$ and unlocked positions $P_4$ to concurrently secure and release the gear 34. When located in the locked position $P_3$, e.g., moved clockwise in FIG. 2, the pawl 36 meshingly engages or otherwise presses against at least one of the gear rack teeth 54; this functions to lock the gear 34 in the latched position $P_1$. In this manner, the gear 34 is prevented from moving to the unlatched position $P_2$, which prevents the release mechanism 24 from being activated and, consequently, precludes the hood latch 22 from being disengaged from the hood assembly 18. Contrariwise, repositioning the pawl 36 to the unlocked position $P_4$, e.g., moved counterclockwise in FIG. 2 via actuator 32, 132, operates to disengage the pawl 36 from the gear 34. This allows the gear 34 to slide to the unlatched position $P_2$ under a tensile force $F_T$ transmitted through cable 26A upon activation of the release mechanism 24. With this movement, the tensile force $F_T$ is transferred to the hood latch 22, disengaging the latch 22 from the hood assembly 18. While shown as a curvilinear ratcheting pawl, the pawl 36 may take on other available configurations, including a complementary spur gear, linearly actuated ratchet gear, etc., without departing from the intended scope of this disclosure. For practical purposes, the gear rack 52 may only require a single tooth 54; nevertheless, additional gear teeth may be provided, for example, to accommodate wear-driven slack in the latch cable 26, 26A, 26B or other conditions that may cause the pawl 36 to miss or otherwise not properly seat against a single gear tooth.

Depending on the configuration of the lockout device 30, movement of the pawl 36 to and from the locked/unlocked positions may be made along straight, circular, arcuate or other functionally applicable paths. As per the illustrated example, the ratchet-style pawl 36 pivots back-and-forth along an arcuate path (indicated by the double-headed curved arrow connecting $P_3$ and $P_4$ in FIG. 2) between the locked and unlocked positions. There are innumerable means for providing this pivoting functionality. Lock housing 38 of FIG. 3, for instance, is fabricated with at least one or, as shown, a pair of circular post holes 43A and 43B, with one post hole 43A extending through the housing shell 40 and one post hole 43B extending through the housing cover 42. Pawl 36 includes a V-shaped body 62 that is integrally formed with a cylindrical swing post 64 with opposing ends that project transversely from the connecting region of the V-shaped body 62. These opposing ends of the swing post 64 are each mounted within one of the post hole 43A, 43B such that the pawl 36 rotates between the locked and unlocked positions $P_3$ and $P_4$.

The vehicle 10 initiates movement of the pawl 36 via a mechanical actuator 32 (FIG. 1), an electromechanical actuator 132 (FIG. 2), an electronic actuator (not shown), or other applicable actuating device. Irrespective of design, the actuator 32, 132 is operatively coupled to the pawl 36 and operatively engaged with a vehicle door to automatically move the pawl 36 to the unlocked position $P_4$ in response to the vehicle door being moved to a partially or fully open position. In the representative architecture set forth in the inset view of FIG. 1, the actuator 32 is generally composed of a spring-biased, plunger mechanism 35 mounted adjacent a door check link 45 of the driver-side door assembly 50, and a lock cable 33 that is mechanically coupled at one end thereof to the pawl 36 and an opposing end thereof to the plunger mechanism 35. As previously described, by closing the door assembly 50, a plunger in the plunger mechanism 35 is compressed, e.g., via a sealing grommet 53 on an inboard surface of the door 50. By compressing this plunger, slack is introduced into the cable 33, which allows the pawl 36 some freedom or "play" to pivot. A biasing member 66 (FIG. 2) presses against and biases the pivotably mounted pawl 36 towards the locked position $P_3$. Any of a variety of different biasing mechanism may be implemented for this feature, including the helical torsion spring configuration illustrated in the drawings. By opening the door 50, the spring-biased plunger in the plunger mechanism 35 will expand and pull on the lock cable 33, which operates to pull the pawl 36 out of meshing engagement with the gear 34. Alternative embodiments operatively couple the pawl 36 to a shift lever or park brake such that the lockout device 30 unlocks the latch when the vehicle 10 is shifted into park.

In the representative architecture set forth in FIG. 2, the actuator is embodied as an electronic solenoid 132 that is mechanically coupled to the pawl 36, e.g., via a discrete lock cable 133. This cable 133 inserts through a dedicated third window 41C in a sidewall of the lock housing's outer shell 40 such that a distal end of the cable 133 passes through a narrow anchor detent 51C in one leg of the pawl's V-shaped body 62. A third bulbous anchor 58C is rigidly secured to the distal end of the lock cable 133, and seated against a wall of the anchor detent 51C. Solenoid 132 of FIG. 2 is also operatively engaged with the driver-side door assembly 50 via a linear transducer 135 or other sensing mechanism that is operable to generate and output an electronic command signal $S_E$ in response to at least the vehicle door 50 being opened. As the door 50 is opened, the linear transducer 135 responsively transmits the command signal $S_E$, either directly or indirectly, to the solenoid 132. Upon receipt of the command signal, the solenoid 132 applies a tensile force to the lock cable 133 to pull the pawl 36, e.g., in a counterclockwise motion in FIG. 2, to the unlocked position $P_4$. When the door 50 is closed, the solenoid 132 will discontinue application of the tensile force to the cable 133; the torsion spring 66 contemporaneously biases the pawl 36 to the locked position $P_3$.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A lock mechanism for a latch system of a closure assembly movably mounted to a motor vehicle, the motor vehicle including a vehicle body and a vehicle door, the latch system including a closure latch releasably securing the closure assembly in a closed position, and a release mechanism operable to disengage the closure latch, the lock mechanism comprising:

a toothed gear rack configured to movably attach to the vehicle body and couple the closure latch to the release mechanism, the toothed gear rack being slidable between a latched position, whereat the closure latch secures the closure assembly in the closed position, and an unlatched position, whereat the toothed gear rack transfers an activation force from the release mechanism to the closure latch to disengage the closure latch from the closure assembly;

a pawl configured to movably attach to the vehicle body, the pawl being rotatable between a locked position, whereat the pawl engages and thereby locks the toothed gear rack in the latched position, and an unlocked position, whereat the pawl disengages the toothed gear rack; and a lock actuator coupled to the pawl and configured to operatively engage the vehicle door, the lock actuator being configured to detect opening of the vehicle door and responsively pull on and thereby rotate the pawl to the unlocked position.

2. The lock mechanism of claim 1, further comprising a lock housing configured to mount to the vehicle body, wherein the toothed gear rack and the pawl are movably mounted to the lock housing.

3. The lock mechanism of claim 2, wherein the lock housing includes a shell and a cover attached to the shell to enclose the toothed gear rack and the pawl within the lock housing.

4. The lock mechanism of claim 2, wherein the lock housing includes a guide rail seating thereon the toothed gear rack such that the toothed gear rack translates rectilinearly between the latched and unlatched positions.

5. The lock mechanism of claim 2, wherein the lock housing includes a post hole, and the pawl includes a swing post mounted within the post hole such that the pawl rotates between the locked and unlocked positions.

6. The lock mechanism of claim 1, wherein the lock actuator further includes a biasing member mating with and urging the pawl towards the locked position.

7. The lock mechanism of claim 6, wherein the biasing member includes a helical torsion spring.

8. The lock mechanism of claim 1, wherein the toothed gear rack includes a plurality of teeth that meshingly engage with the pawl, when in the locked position, to thereby lock the toothed gear rack in the latched position.

9. The lock mechanism of claim 8, wherein the toothed gear rack includes an elongated body integrally formed with the plurality of gear teeth projecting transversely from a lateral side of the elongated body.

10. The lock mechanism of claim 1, wherein the latch system further includes a first cable connected to the release mechanism and a second cable connected to the closure latch, and wherein the toothed gear rack includes first and second anchor slots disposed at opposing first and second ends of the toothed gear rack, respectively, the first and second anchor slots each being configured to receive therein an anchor of a respective one of the first and second cables.

11. The lock mechanism of claim 1, wherein the lock actuator includes:

a sensing device operable to detect opening of the vehicle door and responsively generate a door open command signal; and an electronic solenoid mechanically coupled to the pawl and operable, responsive to the door open command signal, to move the pawl to the unlocked position.

12. The lock mechanism of claim 1, wherein the lock actuator includes:

a plunger-style mechanical actuator configured to engage the vehicle door; and a lock cable mechanically coupled at a first end thereof to the pawl and at a second end thereof, opposite the first end, to the plunger-style mechanical actuator, wherein the plunger-style mechanical actuator is configured, responsive to the vehicle door being opened, to expand and pull on the lock cable such that the lock cable pulls the pawl to the unlocked position.

13. A motor vehicle comprising:
a vehicle body with passenger compartment and an engine compartment;
a hood assembly movably mounted to the vehicle body and covering an opening to an engine compartment, the hood assembly being movable between open and closed positions;
a vehicle door movably mounted to the vehicle body and covering an opening to the passenger compartment;
a primary latch releasably securing the hood assembly in the closed position;
a release mechanism located within the passenger compartment and operable to disengage the primary latch; and
a lock mechanism, including:
  a housing attached to the vehicle body;
  a toothed gear rack slidably mounted inside the housing and coupling the primary latch to the release mechanism, the toothed gear rack being slidable between a latched position, whereat the primary latch secures the hood assembly in the closed position, and an unlatched position, whereat the toothed gear rack transfers an activation force from the release mechanism to the primary latch to disengage the primary latch from the hood assembly;
  a pawl rotatably mounted inside the housing and rotatable between a locked position, whereat the pawl presses against and thereby locks the toothed gear rack in the latched position, and an unlocked position, whereat the pawl disengages the toothed gear rack such that the toothed gear rack is free to slide within the housing; and
  a lock actuator coupled to the pawl and operatively engaged with the vehicle door, the lock actuator being configured to detect opening of the vehicle door and responsively pull on and thereby rotate the pawl to the unlocked position.

14. A method of assembling a lock mechanism for a latch system of a closure movably mounted to a motor vehicle, the motor vehicle including a vehicle body and a vehicle door, the latch system including a closure latch releasably securing the closure in a closed position, and a release mechanism operable to disengage the closure latch, the method comprising:

coupling a toothed gear rack to the closure latch and the release mechanism;

attaching the toothed gear rack to the vehicle body such that the toothed gear rack is slidable between a latched position, whereat the closure latch secures the closure in the closed position, and an unlatched position, whereat the toothed gear rack transfers an activation force from the release mechanism to the closure latch to disengage the closure latch from the closure such that the closure is openable;

attaching a pawl to the vehicle body such that the pawl is rotatable between a locked position, whereat the pawl engages and thereby locks the toothed gear rack in the latched position, and an unlocked position, whereat the pawl disengages the toothed gear rack; and attaching a lock actuator to the pawl, the lock actuator being configured to operatively engage the vehicle door and to detect opening of the vehicle door and responsively pull on and thereby rotate the pawl to the unlocked position.

15. The method of claim 14, wherein attaching the toothed gear rack and the pawl to the vehicle body includes mounting a lock housing to the vehicle body, and movably mounting the toothed gear rack and the pawl to the lock housing.

16. The method of claim 15, wherein the lock housing includes a guide rail seating thereon the toothed gear rack such that the toothed gear rack translates rectilinearly between the latched and unlatched positions, and wherein the lock housing further includes a swing post mounting thereon the pawl such that the pawl rotates between the locked and unlocked positions.

17. The method of claim 15, further comprising mating a biasing member with the pawl such that the biasing member urges the pawl towards the locked position.

18. The method of claim 14, wherein the toothed gear rack includes a plurality of teeth that meshingly engage with the pawl, when in the locked position, to thereby lock the toothed gear rack in the latched position.

19. The method of claim 14, wherein the lock actuator includes an electronic solenoid mechanically coupled to the pawl and operable, responsive to the door open command signal, to move the pawl to the unlocked position.

20. The method of claim 14, wherein the lock actuator includes a plunger-style mechanical actuator configured to engage the vehicle door, and a cable mechanically coupled at a first end thereof to the pawl and at a second end thereof, opposite the first end, to the plunger-style mechanical actuator.

* * * * *